US012563200B2

(12) United States Patent
Bonsor-Matthews

(10) Patent No.: US 12,563,200 B2
(45) Date of Patent: Feb. 24, 2026

(54) SYSTEMS AND METHODS FOR VIDEO ENCODING RATE CONTROL

(71) Applicant: Advanced Micro Devices, Inc., Santa Clara, CA (US)

(72) Inventor: Jonathan Philip Bonsor-Matthews, Milton Keynes (GB)

(73) Assignee: Advanced Micro Devices, Inc., Santa Clara, CA (US)

( * ) Notice: Subject to any disclaimer, the term of this patent is extended or adjusted under 35 U.S.C. 154(b) by 25 days.

(21) Appl. No.: 18/475,757

(22) Filed: Sep. 27, 2023

(65) Prior Publication Data

US 2025/0106403 A1　Mar. 27, 2025

(51) Int. Cl.
　*H04N 19/149*　(2014.01)
　*H04N 19/154*　(2014.01)
(52) U.S. Cl.
　CPC ......... *H04N 19/149* (2014.11); *H04N 19/154* (2014.11)
(58) Field of Classification Search
　CPC ........................... H04N 19/149; H04N 19/154
　See application file for complete search history.

(56) References Cited

U.S. PATENT DOCUMENTS

| | | | | |
|---|---|---|---|---|
| 2011/0268180 A1* | 11/2011 | Srinivasamurthy .. | H04N 19/196 | |
| | | | 375/240.03 | |
| 2013/0010858 A1* | 1/2013 | Kishigami ........... | H04N 19/196 | |
| | | | 375/E7.151 | |
| 2014/0289371 A1* | 9/2014 | Moore ................... | H04L 65/65 | |
| | | | 709/219 | |
| 2015/0124872 A1* | 5/2015 | Zhou .................... | H04N 19/103 | |
| | | | 375/240.03 | |
| 2016/0105675 A1* | 4/2016 | Tourapis .............. | H04N 19/196 | |
| | | | 375/240.02 | |
| 2017/0103167 A1* | 4/2017 | Shah ..................... | G06Q 10/101 | |
| 2019/0089957 A1* | 3/2019 | Zhang .................. | H04N 19/146 | |
| 2019/0200013 A1* | 6/2019 | Wu ....................... | H04N 19/164 | |
| 2020/0221078 A1* | 7/2020 | Seregin ................. | H04N 19/86 | |
| 2023/0069178 A1* | 3/2023 | Sen ........................ | H04L 47/38 | |
| 2023/0336739 A1* | 10/2023 | Gu ....................... | H04N 19/179 | |
| 2024/0064189 A1* | 2/2024 | Li ........................ | G06N 3/0455 | |
| 2024/0232711 A1* | 7/2024 | Oliver ................... | G06V 20/42 | |
| 2024/0244227 A1* | 7/2024 | Ram ................... | H04N 19/172 | |

* cited by examiner

*Primary Examiner* — Jerry T Jean Baptiste
(74) *Attorney, Agent, or Firm* — Greenberg Traurig, LLP

(57) ABSTRACT
The disclosed computer-implemented method for video encoding rate control can include governing, by at least one processor, a video encoding rate at least partly in response to video encoding quality information. The method can additionally include generating, by the at least one processor, an encoded video data bitstream based on input pixel data and according to the video encoding rate. The method can also include determining, by the at least one processor, the video encoding quality information based on reconstructed pixel data. Various other methods, systems, and computer-readable media are also disclosed.

20 Claims, 10 Drawing Sheets

200

300

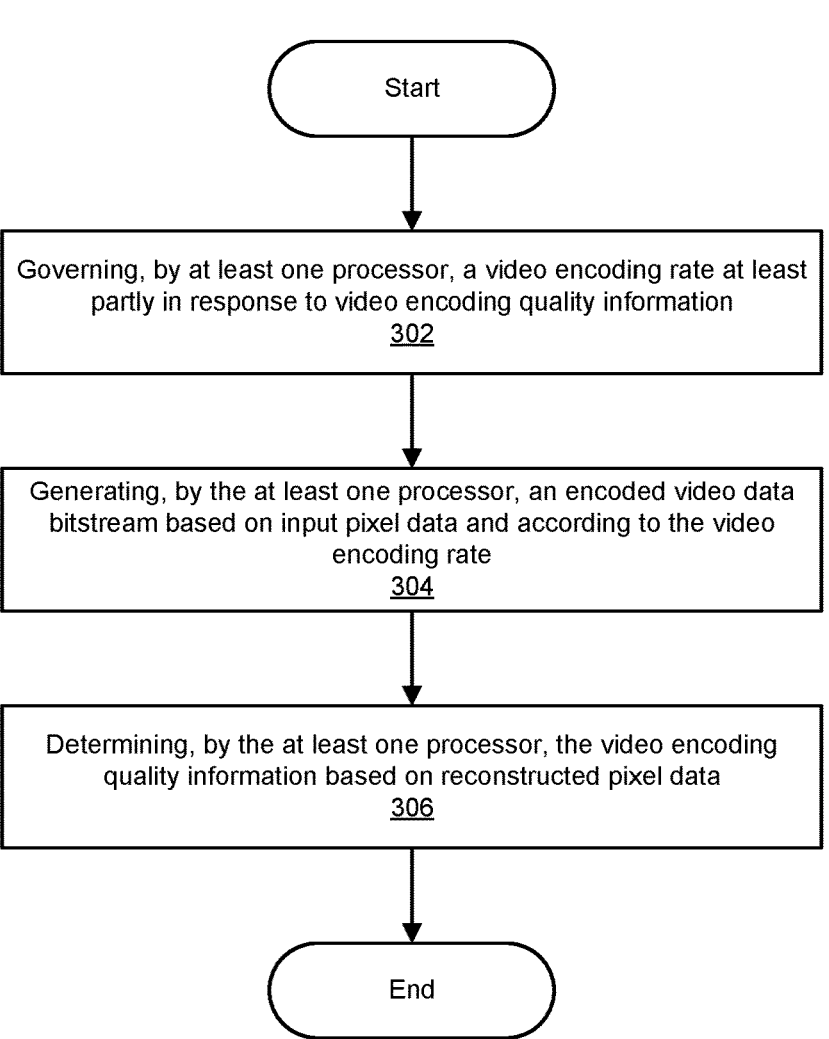

Start

Governing, by at least one processor, a video encoding rate at least partly in response to video encoding quality information
302

Generating, by the at least one processor, an encoded video data bitstream based on input pixel data and according to the video encoding rate
304

Determining, by the at least one processor, the video encoding quality information based on reconstructed pixel data
306

End

*FIG. 3*

| Pre-D Labels | | User Labels | | User Sourced Quality | |
|---|---|---|---|---|---|
| | Content Type | Content Loc. | At Loc. | Overall | |
| Video Type | Avatar | Center | High | High | |
| Game | Bk-Grnd | Periph. | Med. | | |

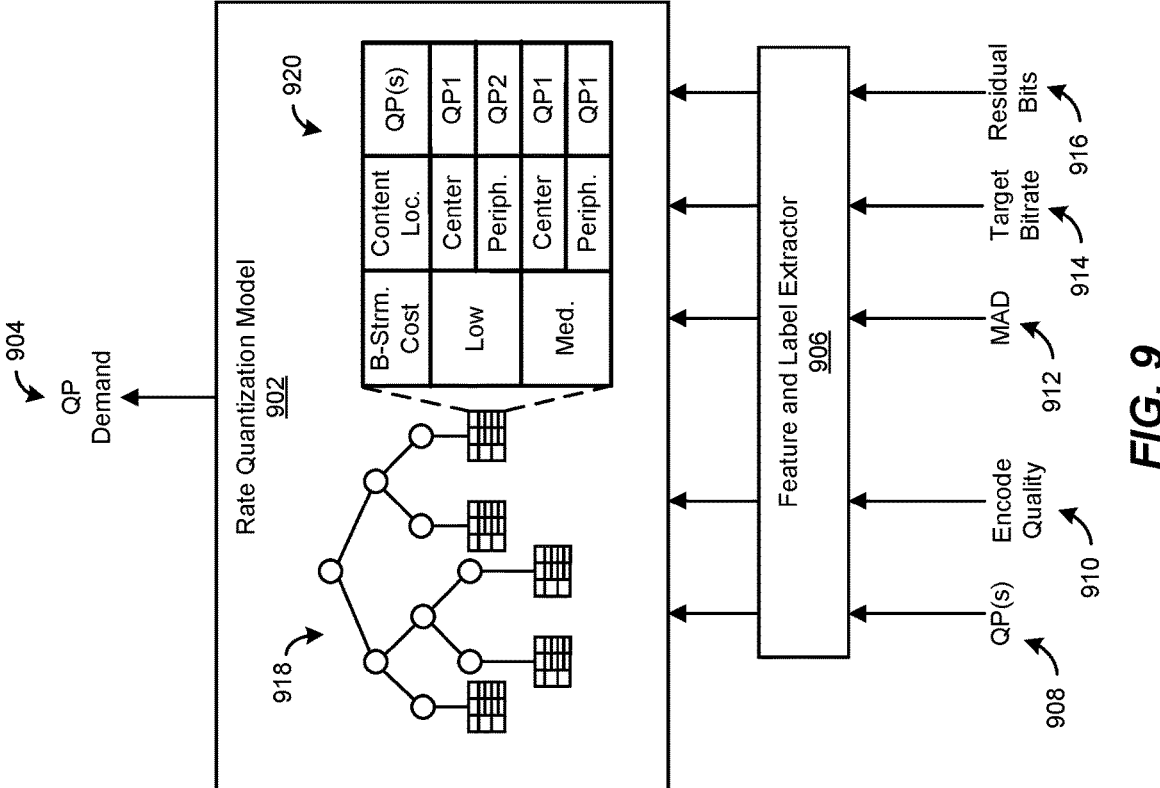
| B-Strm. Cost | Content Loc. | QP(s) |
|---|---|---|
| Low | Center | QP1 |
| | Periph. | QP2 |
| Med. | Center | QP1 |
| | Periph. | QP1 |
*FIG. 9*
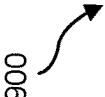

SYSTEMS AND METHODS FOR VIDEO ENCODING RATE CONTROL

BACKGROUND

A metric related to video compression is quality to bitrate trade-off. The bitrate of a video bitstream contributes to the bandwidth requirement on the network, which for many customers can contribute to their experience (e.g., low latency streaming) and to their costs (e.g., for those paying per megabyte). A goal of video encoding rate control is to reduce the bandwidth while keeping the perceived quality of the encode as high as possible.

Current quality measurement calculations can be primitive (e.g., peak signal-to-noise ratio (PSNR)) or more advanced (e.g., structural similarity index measure (SSIM) and/or video multi-method assessment fusion (VMAF)), aiming to better prioritize for the eye's sensitivity. These calculations fail to reliably capture an end-user's perception with a high degree of accuracy. Also, a lack of feedback from the quality measurement to the rate control algorithm results in the rate control algorithm being unable to adapt to the type of content being encoded, instead having to rely on a fixed tuning pre-calculated offline.

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 3 is a flow diagram of an example method for video encoding rate control.

FIG. 9 is a block diagram illustrating an example system implementing a trained rate control model to output one or more quantization parameters in a range.

Figure 1A:
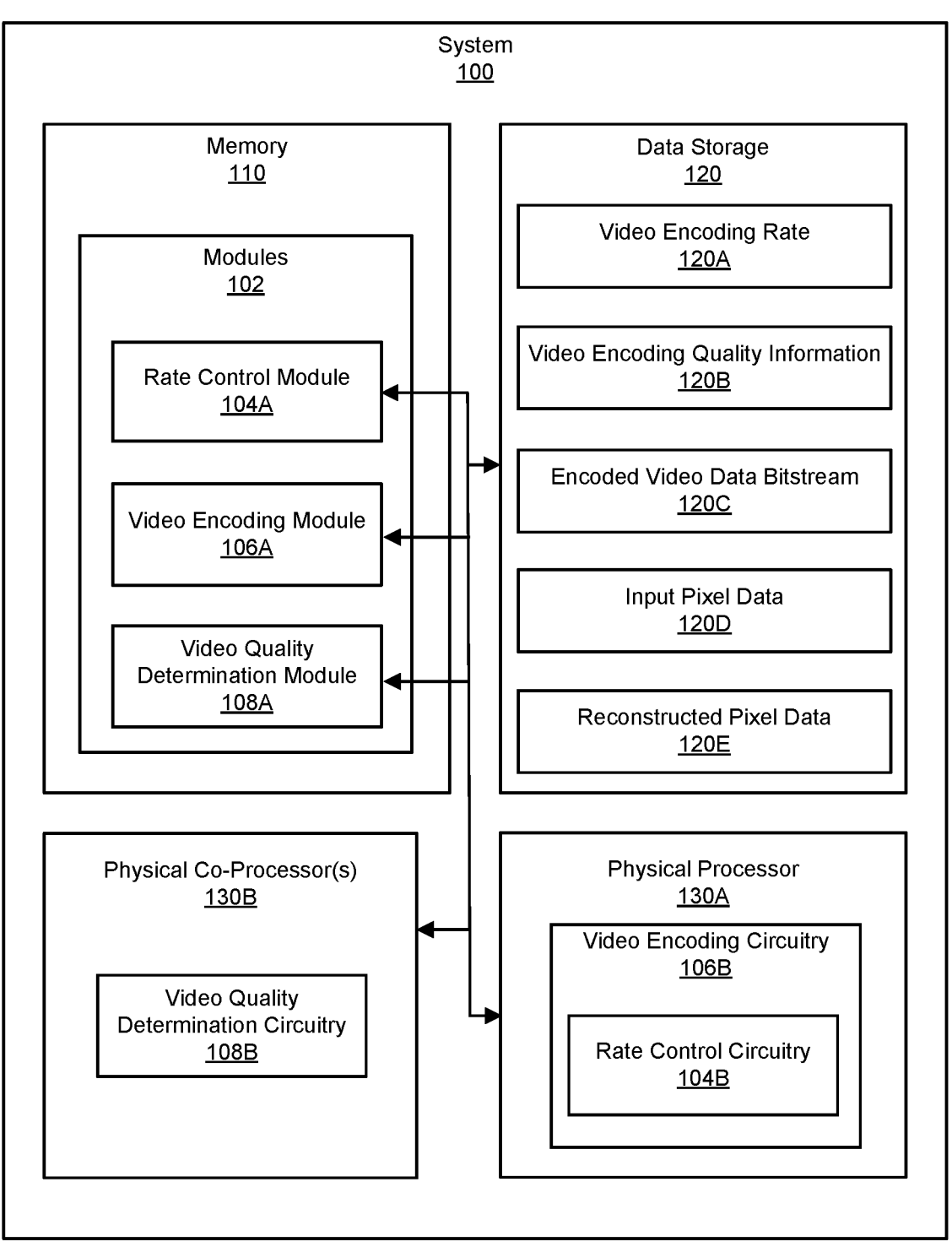
FIG. 1A is a block diagram of an example system for video encoding rate control.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE IMPLEMENTATIONS

The present disclosure is generally directed to systems and methods for video encoding rate control. By governing a video encoding rate at least partly in response to video encoding quality information, generating an encoded video data bitstream based on input pixel data and according to the video encoding rate, and determining the video encoding quality information based on reconstructed pixel data, the rate control algorithm can adapt to the type of content being encoded, instead of having to rely on a fixed tuning pre-calculated offline. Further enhancements can be achieved by employing a trained, probabilistic quality model that determines the video encoding quality information based on the reconstructed pixel data. For example, the trained, probabilistic model can determine the video encoding quality information with improved accuracy and do so independently of the input pixel data.

In one example, a computing device includes rate control circuitry configured to govern a video encoding rate at least partly in response to video encoding quality information, video encoding circuitry configured to generate an encoded video data bitstream based on input pixel data and according to the video encoding rate, and video quality determination circuitry configured to determine the video encoding quality information based on reconstructed pixel data provided by the video encoding circuitry.

Another example can be the previously described example computing device, wherein the video quality determination circuitry includes a trained quality model that determines the video encoding quality information based on the reconstructed pixel data.

Another example can be any of the previously described example computing devices, wherein the trained quality model is a probabilistic model.

Another example can be any of the previously described example computing devices, wherein the trained quality model determines the video encoding quality information independently of the input pixel data.

Another example can be any of the previously described example computing devices, wherein the trained quality model determines the video encoding quality information additionally based on the input pixel data.

Another example can be any of the previously described example computing devices, wherein the trained quality model is trained on quantization parameters provided to the video encoding circuitry and end user decisions regarding video encoding quality of video encoding results achieved using the quantization parameters.

Another example can be any of the previously described example computing devices, wherein the rate control circuitry employs a trained rate control model that is trained on the video encoding quality information, the encoded video data bitstream, a set of video parameters, and the input pixel data.

Another example can be any of the previously described example computing devices, wherein the rate control circuitry is configured to govern the video encoding rate additionally in response to video encoding cost information provided by the video encoding circuitry.

In one example, a system can include an encoder configured to govern a video encoding rate at least partly in response to video encoding quality information, generate an encoded video data bitstream based on input pixel data and according to the video encoding rate, and determine the video encoding quality information based on reconstructed pixel data, and a decoder configured to decode the encoded video data bitstream and output a decoded video data bitstream for display.

Another example can be the previously described example system, wherein the encoder is configured to employ a trained quality model that determines the video encoding quality information based on the reconstructed pixel data.

Another example can be any of the previously described example systems, wherein the trained quality model is a probabilistic model.

Another example can be any of the previously described example systems, wherein the trained quality model determines the video encoding quality information independently of the input pixel data.

Another example can be any of the previously described example systems, wherein the trained quality model determines the video encoding quality information additionally based on the input pixel data.

Another example can be any of the previously described example systems, wherein the trained quality model is trained on quantization parameters and end user decisions regarding video encoding quality of video encoding results achieved using the quantization parameters.

Another example can be any of the previously described example systems, wherein the encoder is configured to employ a trained rate control model that is trained on the video encoding quality information, the encoded video data bitstream, a set of video parameters, and the input pixel data.

Another example can be any of the previously described example systems, wherein the encoder is configured to govern the video encoding rate additionally in response to video encoding cost information.

In one example, a computer-implemented method includes governing, by at least one processor, a video encoding rate at least partly in response to video encoding quality information, generating, by the at least one processor, an encoded video data bitstream based on input pixel data and according to the video encoding rate, and determining, by the at least one processor, the video encoding quality information based on reconstructed pixel data.

Another example can be the previously described example method, further including employing, by the at least one processor, a trained quality model that determines the video encoding quality information based on the reconstructed pixel data.

Another example can be any of the previously described example methods, wherein the trained quality model is a probabilistic model.

Another example can be any of the previously described example methods, wherein the trained quality model determines the video encoding quality information independently of the input pixel data.

Figure 1B:
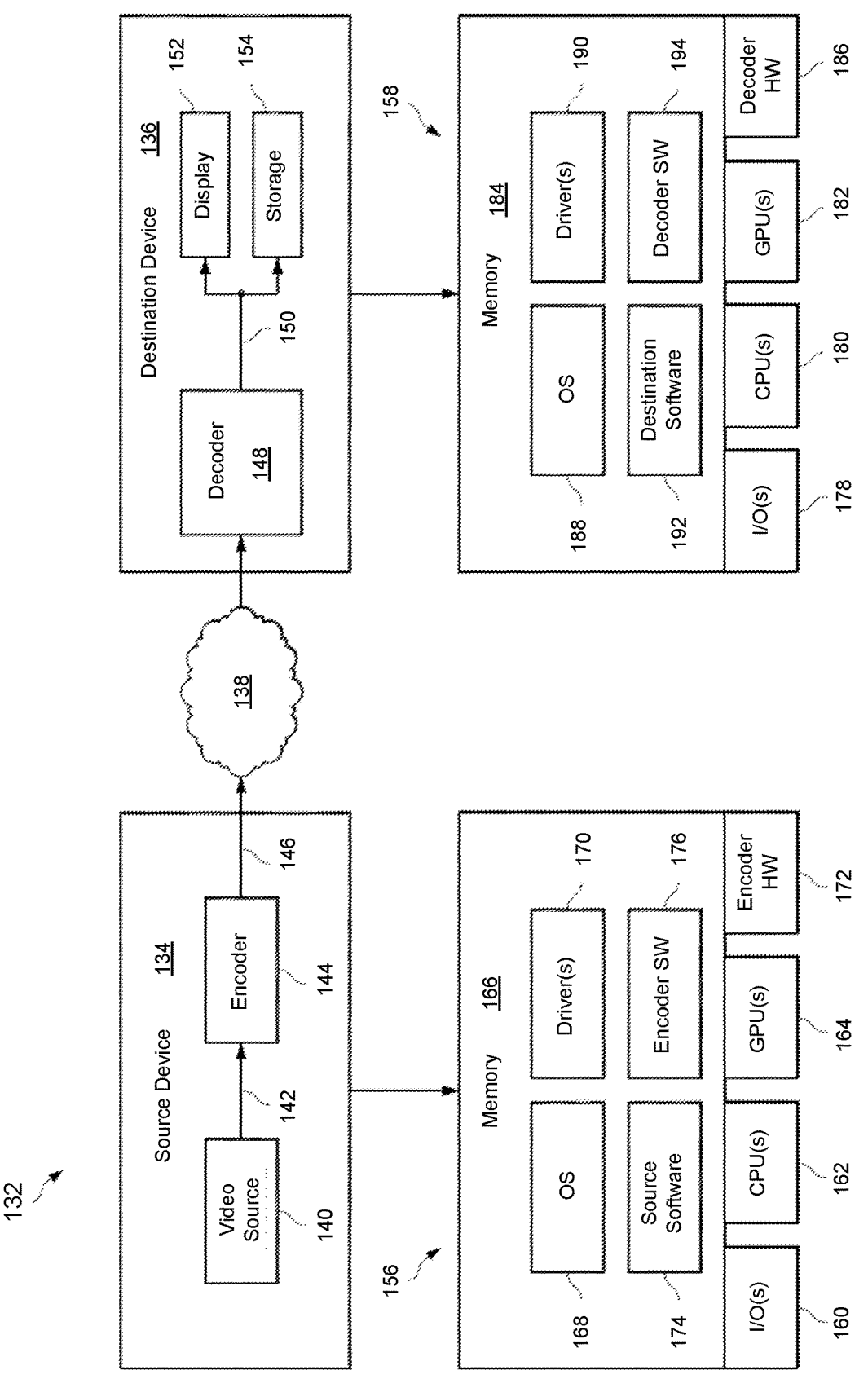
FIG. 1B is a block diagram of an example video coding system 100 for video encoding rate control.
Figure 2:
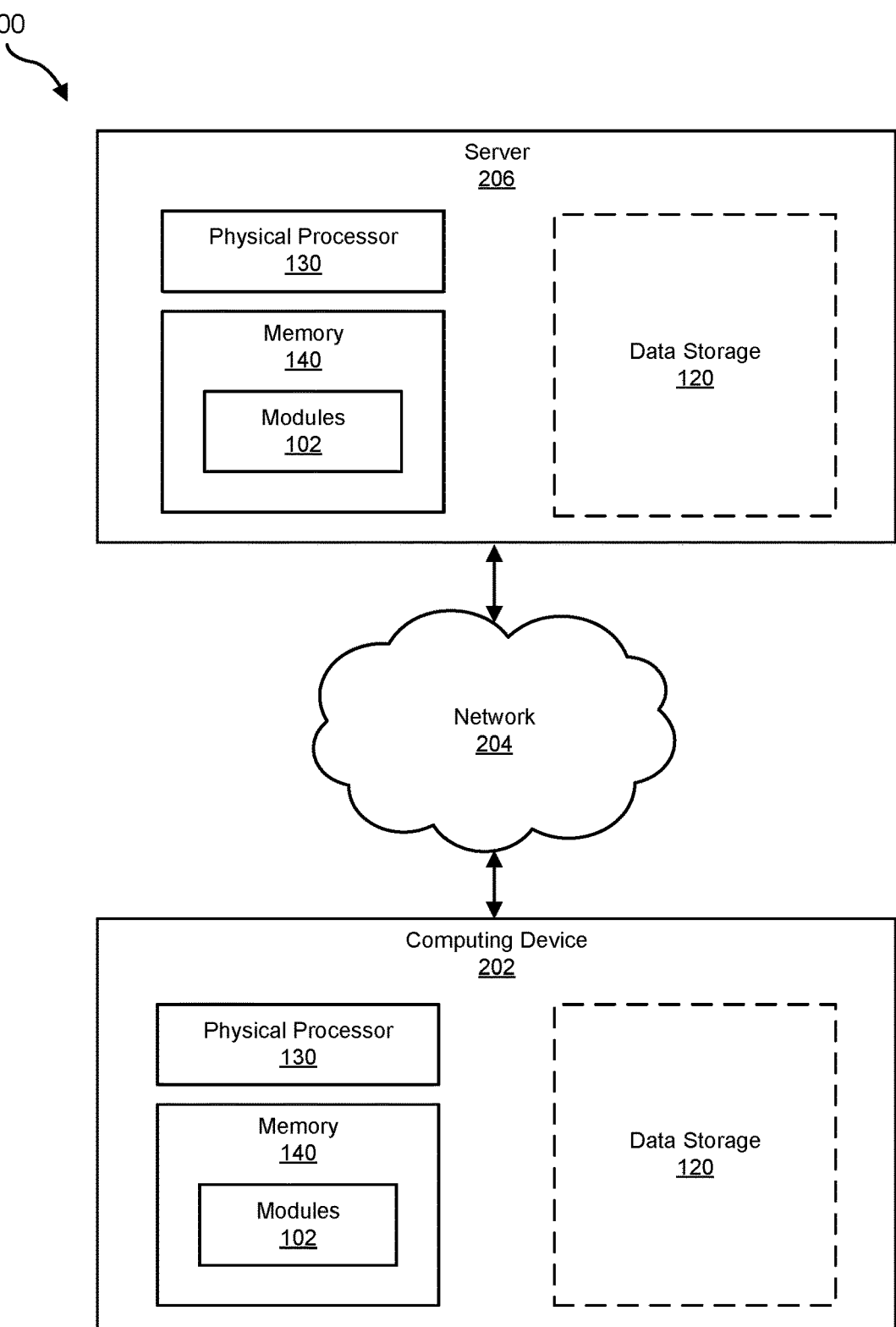
FIG. 2 is a block diagram of an additional example system for video encoding rate control.

The following will provide, with reference to FIGS. 1A, 1B, and 2, detailed descriptions of example systems for video encoding rate control. Detailed descriptions of corresponding computer-implemented methods will also be provided in connection with FIG. 3. In addition, detailed descriptions of example systems for video encoding rate control will be provided in connection with FIG. 4.

FIG. 1A is a block diagram of an example system 100 for video encoding rate control. As illustrated in this figure, example system 100 can include one or more modules 102 for performing one or more tasks. As will be explained in greater detail below, modules 102 can include a rate control module 104A, a video encoding module 106A, and a video quality determination module 108A. Although illustrated as separate elements, one or more of modules 102 in FIG. 1A can represent portions of a single module or application.

The term "modules," as used herein, can generally refer to one or more functional components of a computing device. For example, and without limitation, a module or modules can correspond to hardware, software, or combinations thereof. In turn, hardware can correspond to analog circuitry, digital circuitry, communication media, or combinations thereof.

In certain implementations, one or more of modules 102 in FIG. 1A can represent one or more software applications or programs that, when executed by a computing device, can cause the computing device to perform one or more tasks. For example, and as will be described in greater detail below, one or more of modules 102 can represent modules stored and configured to run on one or more computing devices, such as the devices illustrated in FIG. 2 (e.g., computing device 202 and/or server 206). One or more of modules 102 in FIG. 1A can also represent all or portions of one or more special-purpose computers configured to perform one or more tasks.

As illustrated in FIG. 1A, example system 100 can also include one or more memory devices, such as memory 110. Memory 110 generally represents any type or form of volatile or non-volatile storage device or medium capable of storing data and/or computer-readable instructions. In one example, memory 110 can store, load, and/or maintain one or more of modules 102. Examples of memory 110 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1A, example system 100 can also include one or more physical processors, such as physical processor 130A and/or one or more physical co-processors 130B. Physical processor 130A and/or physical co-processor(s) generally represents any type or form of hardware-implemented processing unit capable of interpreting and/or executing computer-readable instructions. In one example, physical processor 130A and/or physical co-processor(s) 130B can access and/or modify one or more of modules 102 stored in memory 110. Additionally or alternatively, physical processor 130 and/or physical co-processor(s) 130B can execute one or more of modules 102 to facilitate video encoding rate control. Examples of physical processor 130 and/or physical co-processor(s) 130B include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor. In some implementations, physical processor 130A can represent a CPU, and physical co-processor(s) 130B can represent a graphics processing unit (GPU) and/or an accelerator processing unit (APU).

In some examples, physical processor 130A and/or physical co-processor(s) 130B can include hardware used instead of or in combination with modules 102. For example, physical processor 130A can include video encoding circuitry 106B that can include rate control circuitry 104B. Likewise, physical co-processor(s) 130B can include video quality determination circuitry 108B. Rate control circuitry 104B, video encoding circuitry 106B, and/or video quality determination circuitry 108B can be implemented as digital and/or analog circuits that perform all or part of the functionality of rate control module 104A, video encoding module 106A, and/or video quality determination module 108A, respectively. Alternatively or additionally, one or more of rate control circuitry 104B, video encoding circuitry 106B, and/or video quality determination circuitry 108B, and/or one or more portions thereof can be implemented as standalone circuits connected to physical processor 130A and/or physical co-processor(s) 130B.

As illustrated in FIG. 1A, example system 100 can also include one or more instances of stored data, such as data storage 120. Data storage 120 generally represents any type or form of stored data, however stored (e.g., signal line transmissions, bit registers, flip flops, software in rewritable memory, configurable hardware states, combinations thereof, etc.). In one example, data storage 120 includes databases, spreadsheets, tables, lists, matrices, trees, or any other type of data structure. Although depicted as separate from processor 130 and memory 110, data storage 120 can, in whole or in part, be included in processor 130 and/or memory 110. Examples of data storage 120 include, without limitation, video encoding rate 120A, video encoding quality information 120B, encoded video data bitstream 120C, input pixel data 120D, and/or reconstructed pixel data 120E.

FIG. 1B illustrates a video coding system 132 employing video encoding rate control in accordance with some implementations. The video coding system 132 can include a source processing device 134 (also referred to herein as "source device 134") connected to a destination processing device 136 (also referred to herein as "destination device 136") via a connection 138. The source device 134 can include any of a variety of devices or systems used to encode a video stream, whether generated at the source device 134 or received at the source device 134 from another device in encoded or unencoded form. The destination device 136 can include any of a variety of devices or systems used to decode the video stream encoded by the source device 134, whether for consumption at the destination device 136 or for forwarding on to yet another device in encoded or decoded form. In at least some implementations, the source device 134 can also act as the destination device 136 for decoding and rendering the encoded video data generated by the source device 134.

The connection 138, in at least some implementations, can include any of a variety of wired or wireless connections, or a combination thereof, such as a wired cable, a wireless network connection, a wired network connection, the Internet, and the like. For example, the source device 134, in at least some implementations, can include a server that operates to encode camera-captured video content, computer-rendered content, or a combination thereof, for transmission to the destination device 136 in the form of a smartphone, a compute-enabled vehicle entertainment system, a compute-enabled appliance, a tablet computer, a laptop computer, a desktop computer, a video game console, a television, and the like. As another example, each of the source device 134 and the destination device 136 can include a smartphone, a wearable computing device, a tablet computing device, a laptop computer, a desktop computer, a video game console, a television, and the like. Moreover, it will be appreciated that the destination device 136 can, in some examples, operate as a source device and the source device 134 can operate as a destination device for the encoding and decoding of a video stream transmitted in the other direction.

As a general operational overview, a video (or image) source 140 of the source device 134 can operate to generate a sequence 142 of video frames. For example, the video source 140 can include a camera capturing video frames, a video game application, a video conferencing application, a remote desktop sharing application, or another computer application that generates a sequence of video frames, either from camera capture, computer rendering, or a combination thereof. In another example, the video source 140 can generate a single video/image frame. An encoder 144 can encode the sequence 142 of video frames or the single video/image frame, along with any associated audio data and metadata, generating an encoded bitstream 146 that is transmitted to the destination device 136 via the connection 138. At the destination device 136, a decoder 148 can decode the encoded bitstream 146 to generate a recovered sequence 150 of video frames, which then can be presented at a display 152, stored at a storage device 154, re-encoded for transmission to yet another device or for storage, and the like.

The term "display," as used herein, can generally refer to an output device for presentation of information in visual or tactile form. For example, and without limitation, displays can include electronic displays and/or mechanical displays. Example electronic displays can include liquid crystal displays (LCDs), light-emitting diode (LED) displays, segment displays, vacuum fluorescent displays, electroluminescent (ELD) displays, plasma (PDP) displays, laser-powered phosphor displays, cathode-ray tubes, full-area two-dimensional displays (e.g., television sets, computer monitors, head-mounted displays, heads-up displays, virtual reality headsets, broadcast reference monitors, medical monitors, mobile displays, smartphone displays, video walls, etc.), and/or three-dimensional displays (e.g., swept-volume displays, laser displays, holographic displays, light field displays, volumetric displays, etc.). Example mechanical displays can include ticker tape, split-flap displays, flip-disc displays, vane displays, rollsigns, tactile electronic displays, optacons, etc.).

Views 156 and 158 illustrate example hardware configurations for the source device 134 and the destination device 136, respectively. As shown by view 156, the source device 134 can include one or more input/output (I/O) devices 160, including an interface for interfacing with the connection 138 (e.g., a network interface for a network connection, a cable interface for a cable connection, etc.). The source device 134 can further include one or more central processing units (CPUs) 162, one or more accelerated processing devices (APD), such as a graphics processing unit (GPU) 164, and one or more memories 166. The CPU 162 and GPU 164 (or other APD) can each include one or more processing cores (not shown). Each of the one or more processing cores can execute a respective instantiation of a particular work item to process incoming data, where the basic unit of execution in the one or more processing cores can be a work item (e.g., a thread). Each work item can represent a single instantiation of, for example, a collection of parallel executions of a kernel invoked on a device by a command that is to be executed in parallel. A work item can execute at one or more processing elements as part of a workgroup executing at a processing core.

The source device 134 can further include encoder hardware 172 for performing some or all of the video encoding rate control processes described herein and encoding processes. The encoder hardware 172, in at least some implementations, can include one or more of the CPUs 162, one or more of the APDs, such as the GPUs 164, or a combination thereof. Alternatively, in at least some implementations, the encoder hardware 172 can include encoder-specific hardware, such as one or more application-specific integrated circuits (ASICs), one or more programmable logic devices, and the like, or a combination thereof. In other implementations, the encoder hardware 172 can include a combination of one or more CPUs 162, GPUs 164, or a combination thereof, as well as encoder-specific hardware, such as one or more ASICs, one or more programmable logic devices, or a combination thereof. Other hardware components typically implemented at video codec devices, such as speakers, microphones, power supplies, busses, power managers, etc., are omitted for clarity.

The one or more memories 166 can include one or more types of memory, such as random access memory (RAM), read-only memory (ROM), Flash memory, hard disc drives, register files, and the like, and store one or more sets of executable instructions that, when executed by the one or more CPUs 162 and/or the one or more GPUs 164, can manipulate the hardware of the source device 134 to perform the functionality ascribed to the source device 134 herein. In particular, the executable instructions can implement an operating system (OS) 168 for overall control and coordination of the hardware components of the source device 134, device drivers 170, such as graphics drivers, for coordination and control of the one or more GPUs 164 by the one or more CPUs 162, and a video source application/software 174. The video source application 174 can represent the video source 140 in that it can coordinate with the OS 168 and device drivers 170 to control the one or more CPUs 162 and the one or more GPUs 164 to capture, render, or otherwise generate the sequence 142 of video frames. To illustrate, the video source application 174 can include a video conference application, a remote desktop application, a wireless display application, a cloud gaming application, a video streaming application, and the like. In some implementations, the executable instructions can further include encoder software 176 that executes to manipulate the encoder hardware 172 (which can include one or more CPUs 162 and/or one or more GPUs 164) to perform the rate control processes described herein and one or more encoding processes. That is, the encoder 144 can be implemented at least in part by one or more processors that execute software to perform at least some of the rate control processes described herein and one or more encoding processes. As such, the encoder software 176, in at least some implementations, can be implemented in whole or in part as a device driver, such as a graphics driver, as part of the video source application 174, as part of the OS 168, or a combination thereof. In other implementations, the content-aware partitioning processes described herein, and one or more encoding processes, can be implemented entirely in application-specific hardware, such as one or more ASICs or one or more programmable logic devices.

As shown by view 158, the destination device 136, in at least some implementations, can include a hardware configuration similar to the source device 134. As such, the destination device 136, in at least some implementations, can include one or more I/O devices 178, including an interface for interfacing with the connection 138, one or more CPUs 180, one or more APDs, such as a GPU 182, and one or more memories 184. The destination device 136 can further include decoder hardware 186 for performing one or more decoding processes. As with the encoder hardware 172, the decoder hardware 186, in at least some implementations, can include one or more of the CPUs 180, one or more of the GPUs 182, one or more ASICs, one or more programmable logic devices, or a combination thereof. Other hardware components typically implemented at video codec devices, such as speakers, microphones, power supplies, busses, power managers, etc., are omitted for clarity. Depending on the implementation, the destination device 136 can further include one or more components for "consuming" the decoded sequence 150 of video frames, such as the display 152 or the storage device 154.

The one or more memories 184 can include one or more types of memory and store one or more sets of executable instructions that, when executed by the one or more CPUs 180 and/or the one or more GPUs 182, can manipulate the hardware of the destination device 136 to perform the functionality ascribed to the destination device 136 herein. In particular, the executable instructions can implement an OS 188 for overall control and coordination of the hardware components of the destination device 136, device drivers 190, such as a graphics driver, for coordination and control of the one or more GPUs 182 by the one or more CPUs 180, and a video destination application 192. The video destination application 192 can represent the video destination in that it can coordinate with the OS 188 and device drivers 190 to control the one or more CPUs 180 and the one or more GPUs 182 to consume the decoded sequence 150 of video frames, either by a presentation at the display 152, storage at the storage device 154, re-encoding by an encoder (not shown), and the like. To illustrate, the video destination application 192 can include a video conference application, a remote desktop application, a wireless display application, a client gaming application, a video streaming application, and the like.

In some implementations, the executable instructions can further include decoder software 194 that executes to manipulate the decoder hardware 186 (which can include one or more CPUs 180 and/or one or more GPUs 182) to perform one or more decoding processes described herein. That is, the decoder 148 can be implemented at least in part by one or more processors that execute software to perform one or more decoding processes. As such, the decoder software 194, in at least some implementations, can be implemented in whole or in part as a device driver, such as a graphics driver, as part of the video destination application 192, as part of the OS 188, or a combination thereof. In other implementations, one or more decoder processes can be implemented entirely in application-specific hardware, such as one or more ASICs or one or more programmable logic devices.

Example system 100 in FIG. 1A and/or example system 132 in FIG. 1B can be implemented in a variety of ways. For example, all or a portion of example system 100 and/or example system 132 can represent portions of example system 200 in FIG. 2. As shown in FIG. 2, system 200 can include a computing device 202 in communication with a server 206 via a network 204. In one example, all or a portion of the functionality of modules 102 can be performed by computing device 202, server 206, and/or any other suitable computing system. As will be described in greater detail below, one or more of modules 102 from FIG. 1A can, when executed by at least one processor of computing device 202 and/or server 206, enable computing device 202 and/or server 206 to perform video encoding rate control.

Computing device 202 generally represents any type or form of computing device capable of reading computer-executable instructions. In some implementations, computing device 202 can be and/or include a video encoder, a graphics processing unit (GPU), etc. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Server 206 generally represents any type or form of computing device that is capable of reading computer-executable instructions. In some implementations, server 206 can be and/or include a video encoder, a cloud gaming server, etc. Additional examples of server 206 include, without limitation, storage servers, database servers, application servers, and/or web servers configured to run certain software applications and/or provide various storage, database, and/or web services. Although illustrated as a single entity in FIG. 2, server 206 can include and/or represent a plurality of servers that work and/or operate in conjunction with one another.

Network 204 generally represents any medium or architecture capable of facilitating communication or data transfer. In one example, network 204 can facilitate communication between computing device 202 and server 206. In this example, network 204 can facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems can be connected to system 100 in FIG. 1A, system 132 in FIG. 1B, and/or system 200 in FIG. 2. Conversely, all of the components and devices illustrated in FIGS. 1A, 1B, and 2 need not be present to practice the implementations described and/or illustrated herein. The devices and subsystems referenced above can also be interconnected in different ways from that shown in FIG. 2. Systems 100 and 200 can also employ any number of software, firmware, and/or hardware configurations. For example, one or more of the example implementations disclosed herein can be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for video encoding rate control. The steps shown in FIG. 3 can be performed by any suitable computer-executable code and/or computing system, including system 100 in FIG. 1A, system 132 in FIG. 1B, system 200 in FIG. 2, and/or variations or combinations of one or more of the same. In one example, each of the steps shown in FIG. 3 can represent an algorithm whose structure includes and/or is represented by multiple sub-steps, examples of which will be provided in greater detail below.

The term "computer-implemented method," as used herein, can generally refer to a method performed by hardware or a combination of hardware and software. For example, hardware can correspond to analog circuitry, digital circuitry, communication media, or combinations thereof. In some implementations, hardware can correspond to digital and/or analog circuitry arranged to carry out one or more portions of the computer-implemented method. In some implementations, hardware can correspond to physical processor 130A and/or physical co-processors 130B of FIG. 1A. Additionally, software can correspond to software applications or programs that, when executed by the hardware, can cause the hardware to perform one or more tasks that carry out one or more portions of the computer-implemented method. In some implementations, software can correspond to one or more of modules 102 stored in memory 110 of FIG. 1A.

As illustrated in FIG. 3, at step 302 one or more of the systems described herein can govern a video encoding rate. For example, rate control module 104A can, as part of computing device 202 in FIG. 2, govern, by at least one processor, a video encoding rate at least partly in response to video encoding quality information.

The term "video encoding rate," as used herein, can generally refer to an encoding bitrate of a multimedia file. For example, and without limitation, the encoding bitrate can be a size of the file divided by its playback time in seconds multiplied by eight. The video encoding rate can be governed by one or more quantization parameters that control the amount of compression for every macroblock in a frame.

The term "video encoding quality information," as used herein, can generally refer to an estimate of human-perceived quality of a video. For example, and without limitation, video encoding quality information can correspond to a number (e.g., metric) indicative of quality of a video frame or portion thereof (e.g., macroblock). Additionally, video encoding quality information can include a category, subcategory, guestimate of motion, and/or other video parameters.

The systems described herein can perform step 302 in a variety of ways. In one example, rate control module 104A can, as part of computing device 202 in FIG. 2, employ a trained rate control model that is trained on the video encoding quality information, an encoded video data bitstream, a set of video parameters, and input pixel data. In some examples, rate control module 104A can, as part of computing device 202 in FIG. 2, govern the video encoding rate additionally in response to video encoding cost information provided by the video encoding circuitry.

"Video encoding cost," as defined herein, can generally refer to a measure (e.g., bits, bytes, etc.) of an amount of video data (e.g., encoded video data). For example, and without limitation, video encoding cost can apply to a stream, a frame, a macroblock, or a smaller unit.

At step 304, one or more of the systems described herein can generate a bitstream. For example, video encoding module 106A can, as part of computing device 202 in FIG. 2, generate, by the at least one processor, an encoded video data bitstream based on input pixel data and according to the video encoding rate.

The term "video data bitstream," as used herein, can generally refer to a sequence of bits. For example, and without limitation, a video data bitstream can correspond to a set of C headers allowing a simpler access to binary structures such as those specified by MPEG, DVB, IETF, SMPTE, IEEE, SCTE, AOM, etc.

The term "pixel data," as used herein, can generally refer to a binary sequence of numbers representing pixel samples that comprise an image. For example, pixel data can include color, hue, intensity, channel, position, size, etc. Pixel data can often be arranged in a two dimensional grid representing used squares.

The systems described herein can perform step 304 in a variety of ways. In one example, video encoding module 106A can, as part of computing device 202 in FIG. 2, receive quantization parameters from rate control module 104A, encode an input pixel stream based on the received quantization parameters, and output a resulting encoded video data bitstream. In some examples, video encoding module 106A can, as part of computing device 202 in FIG. 2, reconstruct pixel data based on the encoded video data bitstream and output the reconstructed pixel data to video quality determination module 108A.

At step 306, one or more of the systems described herein can determine quality information. For example, video quality determination module 108A can, as part of computing device 202 in FIG. 2, determine, by the at least one processor, the video encoding quality information based on reconstructed pixel data.

The systems described herein can perform step 306 in a variety of ways. In one example, video quality determination module 108A can, as part of computing device 202 in FIG. 2, employ, by the at least one processor, a trained quality model that determines the video encoding quality information based on the reconstructed pixel data. In some implementations, the trained quality model can be a probabilistic model. In some implementations, the trained quality model can determine the video encoding quality information independently of the input pixel data. Alternatively, the trained quality model can determine the video encoding quality information additionally based on the input pixel data. In some examples, the trained quality model can be trained on quantization parameters provided to the video encoding circuitry and end user decisions regarding video encoding quality of video encoding results achieved using the quantization parameters.

Figure 4:
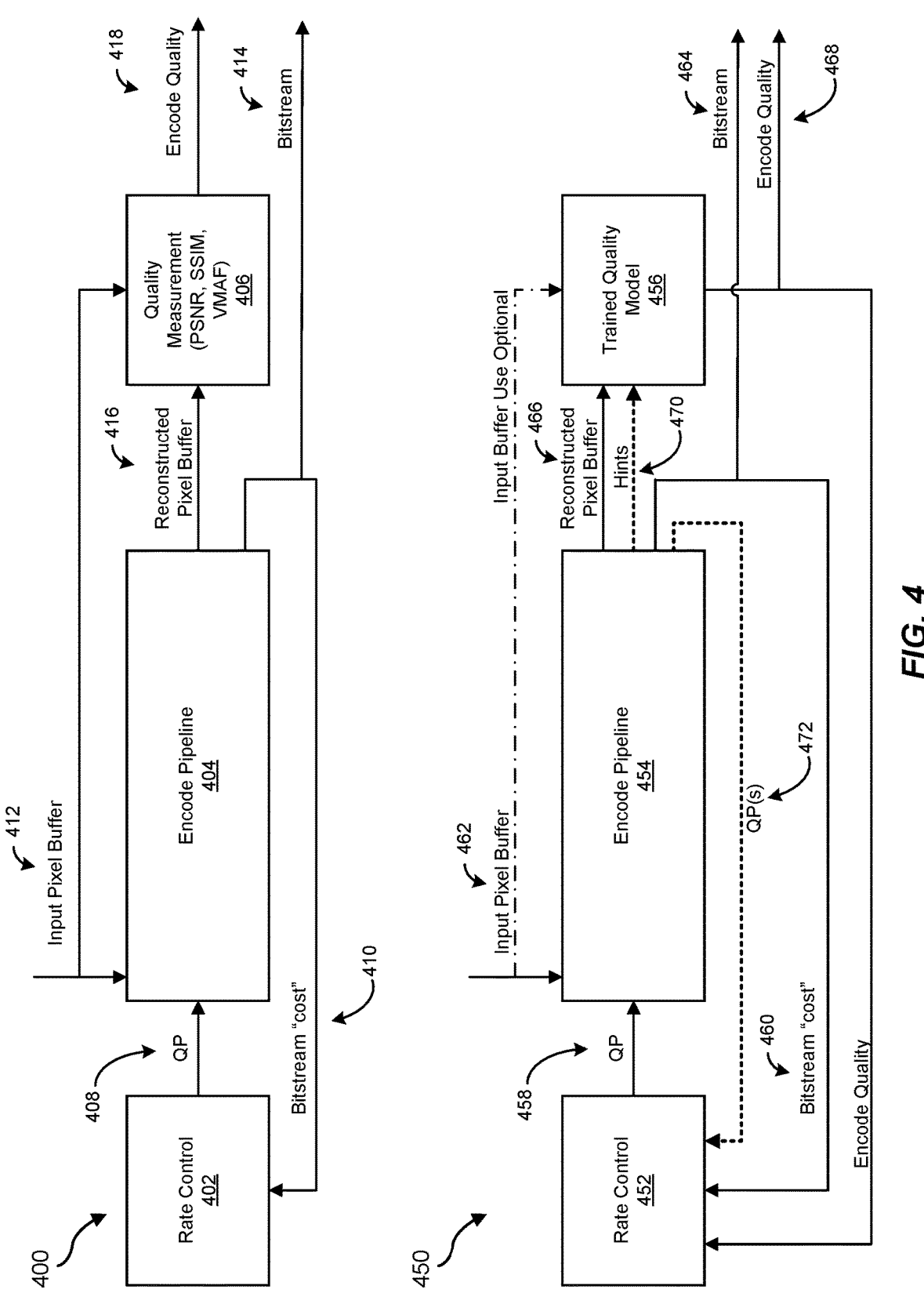
FIG. 4 is a block diagram of example systems for video encoding rate control.

Referring to FIG. 4, example systems 400 and 450 for video encoding rate control are shown. System 400 can include rate control circuitry 402, video encoding circuitry 404 (e.g., configured as an encoding pipeline), and quality measurement circuitry 406. Rate control circuitry 402 can determine rate control information 408 (e.g., quantization parameters (QP)) that control an amount of compression for every macroblock (e.g., up to a 64×64 block of pixels) in a video frame. Larger QP values can result in higher quantization, more compression, and lower quality. An acceptable range of QP can be tuned offline and the rate control circuitry 402 can determine a QP value in the acceptable range based on a video encoding cost 410 (e.g., in bytes) for a previous frame provided by the video encoding circuitry. Thus, using a simple heuristic, the rate control circuitry 402 can achieve an allowable cost budget within this predefined range of QP for a next frame, outputting the determined QP as one or more video encoding rates for one or more video frames or portions thereof (e.g., macroblocks).

Video encoding circuitry 404 can receive input pixel data 412 (e.g., from an input pixel buffer) for a video frame or portion thereof (e.g., a macroblock). Video encoding circuitry 404 can also receive the rate control information 408 from the rate control circuitry 402 and use the received QP to encode the input pixel data 412, resulting in an encoded video data bitstream 414. Video encoding circuitry can use various types of encoding algorithms and apply different encoding algorithms to input pixel data 412 of different portions (e.g., macroblocks) of the video frame based on various criteria, such as location of content in the video frame. Video encoding circuitry can also determine the size (e.g., in bytes) of video frames of the encoded video data bitstream 414 and relay this information to the rate control circuitry 402. Additionally, video encoding circuitry 404 can use a decoding algorithm to decode the encoded video data bitstream 414, resulting in reconstructed pixel data 416 output (e.g., as a reconstructed pixel buffer) by the video encoding circuitry 404 to the quality measurement circuitry 406. In some examples, the decoding algorithm can be a similar type of decoding algorithm to an additional decoding algorithm employed by a downstream decoder. In some examples, the decoding algorithm can be a same type of decoding algorithm as additional decoding algorithm employed by a downstream decoder. In some examples, the decoding algorithm can be identical to additional decoding algorithm employed by a downstream decoder.

Quality measurement circuitry 406 can receive the input pixel data 412 and the reconstructed pixel data 416 and generate quality measurements, such as peak signal-to-noise ratio (PSNR), structural similarity index measure (SSIM), and/or metrics produced using video multi-method assessment fusion (VMAF) (e.g., visual information fidelity (VIF), detail loss metric (DLM), mean co-located pixel difference (MCPD), etc.). Quality measurement circuitry 406 can output the quality metrics as encoding quality information 418. The encoding quality information 418 can be output by a reporting function and the reported quality information can be used offline for various purposes, such as tuning the acceptable range of QP employed by the rate control circuitry 402. However, such tuning requires human intervention and does not occur in real time, thus failing to impact the rate control for the current encoded video data bitstream 414.

As noted above, quality measurement calculations such as PSNR, SSIM, and VMAF metrics can fail to reliably capture an end-user's perception very accurately. Also, a lack of feedback from the quality measurement circuitry 406 to the rate control circuitry 402 results in the rate control circuitry 402 being unable to adapt to the type of content being encoded, instead having to rely on a fixed tuning precalculated offline.

System 450 can include rate control circuitry 452 that can correspond to an example implementation of rate control module 104A and/or rate control circuitry 104B of FIG. 1A, encoding circuitry 454 that can correspond to an example implementation of video encoding module 106A and/or video encoding circuitry 106B of FIG. 1A, and/or video quality determination circuitry 456 that can correspond to an example implementation of video quality determination module 108A and/or video quality determination circuitry 108B of FIG. 1A. In some implementations, rate control circuitry 452 can employ a trained rate control model, video encoding circuitry 454 can be configured as an encoding pipeline, and video quality determination circuitry 456 can employ a trained quality model.

Video encoding circuitry 454 can operate, at least in part, in a same or similar manner as described above for video encoding circuitry 404. Thus, video encoding circuitry 454 can receive rate control information 458 and input pixel data 462, and output an encoded video data bitstream 464, a video encoding cost 460, and reconstructed pixel data 466. In some implementations, video encoding circuitry 454 additionally can provide one or more hints 470 (e.g., color information, motion vectors, estimated error, etc.) to the video quality determination circuitry 456.

Unlike quality measurement circuitry 406, video quality determination circuitry 456 can not only produce video encoding quality information 468 for a reporting function, but also relay the video encoding quality information 468 to the rate control circuitry 452. Additionally, unlike rate control circuitry 402, rate control circuitry 452 can use the received video encoding quality information 468 to improve rate control. Also, rate control circuitry 452 and/or video quality determination circuitry 456 can employ trained models to carry out their functions.

Video quality determination circuitry 456 can employ a trained quality model to improve the assessment of video quality based on reconstructed pixel data 466. In some examples, the trained quality model can be a probabilistic model subjectively trained on quantization parameters provided to the video encoding circuitry 454 and end user decisions regarding video encoding quality of video encoding results achieved using the quantization parameters. In some of these examples, a set of training data can be prepared by labeling videos according to various criteria, such as video type (e.g., gaming app, computer desktop, video chat, natural content (e.g., security camera, traffic camera, webcam, etc.), etc.). The videos can also be analyzed and labeled by various parameters, such as motion, content type, content location in the video frame, resolution, color, contrast, brightness, smoothness, etc.). End users can rate the quality of the decoded, labeled videos and indicate one or more locations in frame where they perceive the quality to be good or bad. Results of this process can be used for network training to produce a trained probabilistic model that can assess quality, video type, video content, video parameters, etc. Thus, video encoding quality information 468 can be generated (e.g., per video frame and/or portion thereof (e.g., macroblock)) based solely on reconstructed pixel data 466 and take the form of a number (e.g., metric), category, guestimate of motion and/or other video parameters, etc. Additionally, video quality determination circuitry 456 can also receive the input pixel data 462, perform quality measurements (e.g., PSNR, SSIM, VMAF), and provide the measurement results in the reporting function and/or to rate control circuitry 452.

In some implementations, the video encoding circuitry 454 can provide one or more hints 470 to the video quality determination circuitry 456. For example, the hints 470 can include data like color information, motion vectors, estimated error (e.g., sum of absolute difference (SAD) and/or SAD value of a $T^{th}$ block in a frame (SATD) from motion estimation and/or transform selection), etc. The video quality determination circuitry 456 can combine these hints 470 with metadata of the reconstructed pixel data 466, such as resolution reported in a frame header of the reconstructed pixel data 466, to aid in classifying the reconstructed pixel data 466. The hints 470 and metadata, for example, can supplement extracted features determined from the contents of the reconstructed pixel data 466. Some example implementations demonstrating example training and use of trained quality model of video quality determination circuitry 456 are described later herein with reference to FIGS. 5 and 6.

Rate control circuitry 452 can receive the video encoding cost 460 and the video encoding quality information 468 and determine the rate control information 458 (e.g., quantization parameters) in an improved manner. In some implementations, rate control circuitry 452 can employ a heuristic to balance quality and cost with QP output in a QP range. In other examples, rate control circuitry 452 can employ a trained rate control model (e.g., a trained, probabilistic model). For example, once the trained quality model has been established, the trained rate control model can be developed using self-guided network training based on inputs that include the video encoding quality information, the encoded video data bitstream, a set of video parameters, and the input pixel data. Once trained, the trained rate control model can respond to various input video encoding costs and video encoding qualities to output QP within a QP range.

In some implementations, the rate control circuitry 452 can classify ranges of one or more QPs 472 provided by the encoding circuitry 454 based on the encode quality information 468 and/or the bit stream cost 460. Alternatively or additionally, rate control circuitry 452 can store QPs locally for classification based on bit stream cost 460 provided by the encoding circuitry 454 and encode quality information 468 provided by the video quality determination circuitry 456. A rate control model trained in this manner can determine and enforce QP ranges based on input bitstream cost 460 and encode quality information 468. In some implementations, rate control circuitry 452 can continue to use QPs (e.g., locally stored and/or reported by encoding circuitry 454) to adapt a trained rate control model in the manner of a self-learning system.

The term "self-learning system," as used herein, can generally refer to an artificial agent that can acquire and renew knowledge on its own over time, without the need for hard coding. For example, and without limitation, self-learning systems can be adaptive systems whose functionalities increase through a learning process that is generally based on trial and error. The working principle of such self-training algorithms can be to learn a classifier iteratively by assigning pseudo-labels to a set of unlabeled training samples with a margin greater than a threshold. Some example implementations demonstrating example rate control model training and use are described later herein with reference to FIGS. 7-9.

Figure 5:
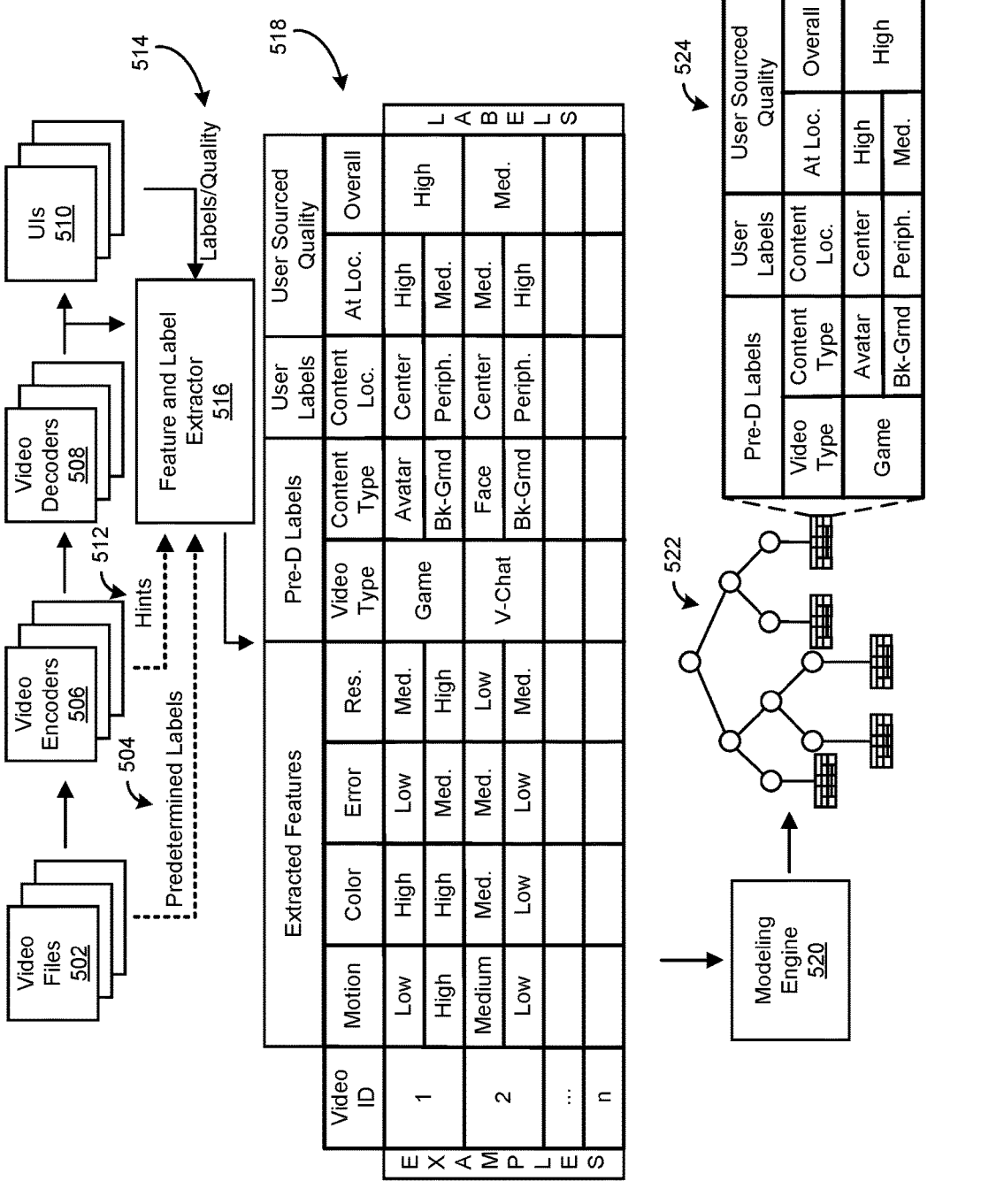
FIG. 5 is a block diagram illustrating an example system for video quality model training.

Referring to FIG. 5, an example system 500 for video quality model training can include a plurality of video files 502 that can have predetermined labels 504 indicating video type (e.g., game, video chat, desktop, natural content, etc.). One or more video encoders 506 can encode the video files 502. For example, multiple encoders can encode a same video file using different QPs for decoding by one or more video decoders 508 and display to one or more human subjects via one or more user interfaces 510. The human subjects can view the decoded videos and provide labels 514 (e.g., content location and/or quality assessments (e.g., at particular frame locations and/or overall quality)).

Feature and label extractor 516 can receive the predetermined labels 504, one or more hints 512 from the video encoders 506, decoded video from the video decoders 508, and/or labels 514. Using this information, feature and label extractor 516 can assemble a data structure 518 (e.g., table) recording example videos (e.g., by video display instances and/or human subjects). For individual example videos, data structure 518 can record extracted features (e.g., motion, color, error, resolution, etc.) provided by the hints 512, metadata of the decoded video, and/or one or more features automatically determined by feature and label extractor 516 based on video contents. Data structure 518 additionally can record labels, such as the predetermined labels 504 and labels 514. Modeling engine 520 can utilize data structure 518 as training data for training a quality model 522 (e.g., a classifier).

Modeling engine 520 can train various types of quality models 522 in a variety of ways. In one example, modeling engine 520 can employ classification techniques to develop classes of labels based on extracted features. A resulting quality model 522 can correspond to a tree structure having branches that are traversable. For example, some branches can correspond to extracted features while others can correspond to ranges of values based on one or more threshold values of extracted features. Modeling engine 520 can determine these threshold values automatically based on the classification and/or use one or more other techniques, such as clustering and/or regression. Leaves of the tree structure can contain labels 524 for a class identified by the modeling engine 520.

The term "classification," as used herein, can generally refer to a supervised technique in which an algorithm looks at existing data and predicts a class to which new data belongs. In contrast, the term "regression," as used herein, can generally refer to a supervised technique that predicts continuous valued output rather than predicting classified labels. In further contrast, the term "clustering," as used herein, can generally refer to an unsupervised technique in which an algorithm finds a pattern in data sets without labels associated with it. In these contexts, the term "features," as used herein, can generally refer to known values used to calculate results (e.g., variables that are known (e.g., predetermined and/or dynamically determined) during both training and classification and that have an impact on a prediction). Also in these contexts, the term "labels," as used herein, can generally refer to values on which a prediction is built (e.g., known for training but not for prediction).

Figure 6:
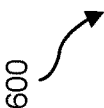
FIG. 6 is a block diagram illustrating an example system implementing a trained video quality model to determine video quality.

Referring to FIG. 6, an example system 600 implementing a trained video quality model 602 can determine video quality (e.g., encode quality). For example, feature extractor 604 can receive hints 606 and/or reconstructed pixel buffer 608 from the encoding circuitry. In some implementations, feature extractor 604 can extract metadata from the reconstructed pixel buffer 608 (e.g., from frame headers) and/or automatically extract one or more features based on video contents of the reconstructed pixel buffer 608. Using these types of features, feature extractor 604 can traverse a classifier 610 of the trained quality model 602 to arrive at a set of classified labels 612. In one example, a set of classified labels 612 can include labels for video type, content types, content locations, quality at the content locations, and/or overall quality. Feature extractor 604 can output any or all of these labels as encode quality information 614 that is provided to rate control circuitry.

Figure 7:
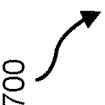
FIG. 7 is a block diagram of an example rate control circuit.

Referring to FIG. 7, example rate control circuitry 700 can implement a rate quantization model 702 that can relate QP, an actual bit rate (e.g., target bits), and a surrogate (e.g., mean average difference (MAD)) for encoding complexity. In such a model, bits and complexity terms can be associated only with residuals so that the quantization parameter QP can influence only the detail of information carried in the transformed residuals. Thus, QP can have no direct impact on bitrates associated with overhead, prediction data, and/or motion vectors. The MAD can be used for this purpose.

In some implementations, the rate quantization model 702 can take an algebraic form, such as Residual Bits=C1*MAD/QP+C2*MAD/QP2, but the model can take a simpler form (with C2=0) or a more complicated form involving exponentials or other basis curves for fitting in other implementations. The free coefficients C1 and C2 can be estimated empirically by providing hooks in the encoder for extracting the residual coefficients as well as the number of residual bits needed to transmit them.

The rate quantization model 702 can solve for a QP demand when a target value of the residual bits (e.g., target bits) is supplied to the model 702 by, for example, one or more bit allocators (e.g., group of pictures (GOP) bit allocator 704 and/or basic unit bit allocator 706). A complexity estimator 708 can implement a simple metric that reflects an encoding complexity associated with the residuals. The MAD of the prediction error can be a convenient surrogate for this purpose:

$$MAD = \sum\nolimits_{i,j} |residual_{i,j}| = \sum\nolimits_{i,j} |source_{i,j} - prediction_{i,j}|.$$

This MAD can be an inverse measure of a predictor's accuracy and, in the case of interprediction, temporal similarities of adjacent pictures. Generally, it can be assumed that this complexity surrogate can vary gradually from picture to picture, allowing it to be estimated based upon data (e.g., basic unit residuals) extracted from the encoder for previous pictures. However, this assumption can fail, for example, at a scene change, in which case MAD can be estimated after encoding the current picture and the picture can be encoded again after QP is selected.

In some implementations, the rate quantization model 702 can include a rate change limiter 710 to limit changes in QP (e.g., to no more than plus or minus two units between pictures). Such a limiter 710 can be useful to guarantee stability and minimize perceptible variations in quality that might otherwise occur in a closed loop control system. For difficult sequences having rapid changes in complexity, QP demand can oscillate noticeably, so a rate change limiter 710 can be applied to manage these types of situations.

Decoders are often equipped with a buffer to smooth out variations in the rate and arrival time of incoming data. A corresponding encoder can produce a bitstream that satisfies constraints of the decoder. Accordingly, a virtual buffer model 712 can be used to simulate the fullness of the real decoder buffer.

In some examples, a change in fullness of the virtual buffer model 712 can be the difference between the total bits encoded into the stream, less a constant removal rate assumed to equal the bandwidth (e.g., demanded bitrate). The buffer fullness can be bounded by zero from below and by the buffer capacity from above. A user or other source can specify appropriate values for buffer capacity and initial buffer occupancy (e.g., fullness) as can be consistent with any decoder levels supported.

Some implementations can include a QP initializer 714 that initializes QP upon start of a video sequence. An initial value can be input manually, but another approach can be to estimate it from the demanded bits per pixel (i.e., DemandedBitsPerPixel=DemandedBitrate/ (FrameRate*height*width)). Alternatively or additionally, a data structure, such as a table, can be used that relates initial QP to demanded bits per pixel.

In some examples, the GOP bit allocator 704 can determine a GOP target bit rate based on a demanded bitrate and a current buffer fullness of the virtual buffer. In some implementations, the GOP bit allocator 704 can also determine QP for the GOP's I-picture and first P-picture. The GOP target bitrate can be fed back into a next block for detailed bit allocation to pictures and/or to smaller basic units.

In some examples, the basic unit bit allocator 706 can control a level of granularity at which rate control can be applied. Example levels of granularity can include, without limitation, a picture, a slice, a macroblock row, any contiguous set of macroblocks, etc. This level of granularity can be referred to as a basic unit at which rate control is resolved, and for which one or more distinct values of QP can be generated. In this context, if the basic unit is smaller than a picture, then QP generation can be layered to generate QP values for a basic unit as well as for the picture as a whole. For example, considering the MAD of a picture, a target level can be determined for buffer fullness and a target bitrate for the picture can be determined using this target level.

The rate quantization model 702 can further generate QP based on encode quality provided by the video quality determination circuitry. For example, and as detailed above with reference to FIG. 4, rate quantization model 702 can employ a heuristic to balance quality and cost with QP output in a QP range. In other examples, rate quantization model 702 can employ a trained rate control model (e.g., a trained, probabilistic model). For example, once the trained quality model has been established, the trained rate control model can be developed using self-guided network training based on inputs that include the video encoding quality information, the encoded video data bitstream, a set of video parameters, and/or the input pixel data. Once trained, the trained rate control model can respond to various input video encoding costs and video encoding qualities to output QP within a QP range.

In some implementations, rate quantization model 702 can use the encode quality to adjust (e.g., increase, limit, etc.) the residual bits, the MAD, and/or the target bitrate. Alternatively or additionally, rate quantization model 702 can use the encode quality to apply upper and/or lower limits to the QP, thus ensuring that it lies within a QP range. In some of these examples, rate quantization model 702 can use the encode quality to determine a lower limit of such a range and use the MAD and/or another encoding cost metric to determine an upper limit of such a range. One or more data structures (e.g., tables) storing predetermined and/or dynamic (e.g., trained) values can be accessed based on encode quality and/or encoding cost to retrieve appropriate QP range values (e.g., limits).

Figure 8:
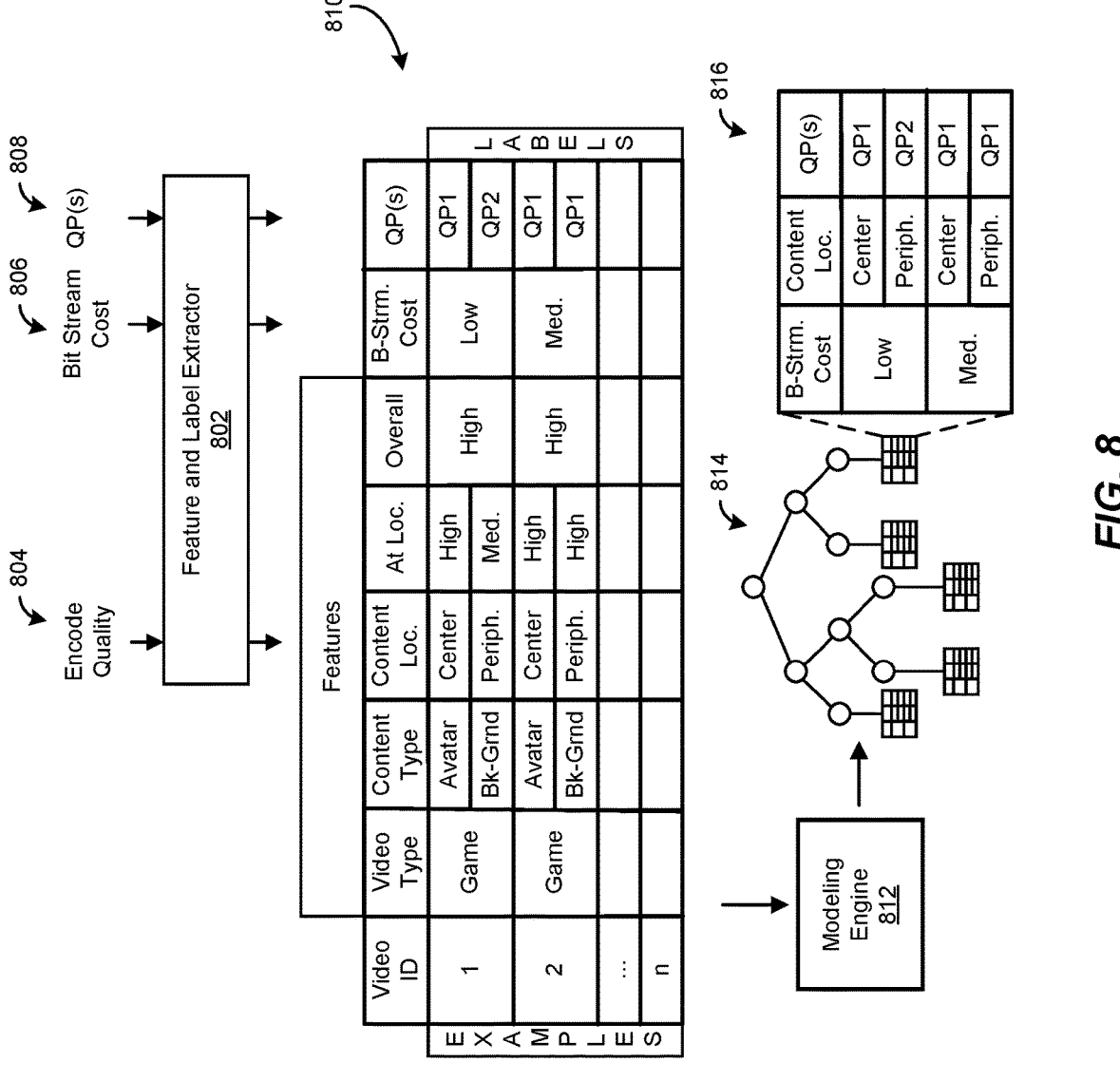
FIG. 8 is a block diagram illustrating an example system for rate control model training.

Referring to FIG. 8, an example system 800 for rate control model training can include a feature and label extractor 802 that can receive an encode quality 804, a bit stream cost 806, and one or more QP(s). Using this information, feature and label extractor 802 can assemble a data structure 810 (e.g., table) recording example videos (e.g., by video encoding instances). For individual example videos, data structure 810 can record extracted features (e.g., video type, content type, content locations, quality at a locations, bitstream cost, QP(s), etc.) provided to feature and label extractor 802. Data structure 810 additionally can record labels, such as the bitstream cost, content locations, QP(s), etc. Modeling engine 812 can utilize data structure 810 as training data for training a rate control model 814 (e.g., a classifier).

Modeling engine 812 can train various types of rate control models 814 in a variety of ways. In one example, modeling engine 812 can employ classification techniques to develop classes of labels based on extracted features. A resulting rate control model 814 can correspond to a tree structure having branches that are traversable. For example, some branches can correspond to extracted features while others can correspond to ranges of values based on one or more threshold values of extracted features. Modeling engine 812 can determine these threshold values automatically based on the classification and/or use one or more other techniques, such as clustering and/or regression. Leaves of the tree structure can contain labels 816 for a class identified by the modeling engine 812.

In some implementations, modeling engine can employ certain features (e.g., content location) as both features and labels. In some implementations, modeling engine 812 can employ all of the inputs as features and use regression to predict continuous valued output rather than predicting classified labels. In some implementations (e.g., as shown in FIG. 8), modeling engine 812 can employ encode quality 804 as features and bit stream cost 806 and QP(s) 808 as labels. In some implementations, modeling engine 812 can employ encode quality 804 and bitstream cost 806 as features and QP(s) 808 as labels. In some implementations, modeling engine 812 can develop one or more QP range thresholds based on QP(s) 808 and employ the one or more QP range thresholds as labels.

Referring to FIG. 9, an example system 900 can implement a trained rate control model 902 to output one or more QP(s) 904 (e.g., QP demand) in a range. For example, feature extractor 906 can receive QP(s) 908 (e.g., from the encoding circuitry and/or local storage), encode quality 910 (e.g., from the trained quality model), and/or bit stream cost (e.g., MAD 912, target bitrate 914, and/or residual bits 916) from the encoding circuitry. Using these types of features and/or labels, feature and label extractor 906 can traverse a classifier 918 of the trained rate control model 902 to arrive at a set of classified labels 920. In one example, a set of classified labels 920 can include labels for bitstream cost, content locations, and/or QP(s) (e.g., one or more QP range thresholds). Feature and label extractor 906 can output any or all of these labels as one or more QP(s) 904 (e.g., QP demand) that is provided to encoding circuitry. Alternatively or additionally, feature and label extractor 906 can select one or more QP range thresholds based on bitstream cost and output one or more QP(S) within a QP range defined by the one or more QP range thresholds. In some implementations, feature and label extractor 906 can learn the classifier 918 iteratively (e.g., by assigning pseudo-labels to a set of unlabeled training samples with a margin greater than a threshold).

As set forth above, the disclosed systems and methods for video encoding rate control can compute a quality metric based solely on the equivalent decoded output and update the rate control algorithm to be auto-adaptive based on the output. In some implementations, a trained, probabilistic model can be used to measure the quality, and this model can be implemented as a neural network or other trainable implementation. The model can output an estimated human-perceived metric for the quality, and this metric can be fed back into the rate control algorithm to ensure that the video encoding parameters better adapt to match the content being encoded. Advantageously, the disclosed systems and methods for video encoding rate control can achieve a reduced bitrate for a same human-perceived encoding quality. Additionally, as the rate control is improved to be auto-adaptive, its stability and ability to function well over a wide range of content types can also improve.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1A and/or system 132 in FIG. 1B can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In various implementations, all or a portion of example system 100 in FIG. 1A and/or example system 132 in FIG. 1B can facilitate multi-tenancy within a cloud-based computing environment. In other words, the modules described herein can configure a computing system (e.g., a server) to facilitate multi-tenancy for one or more of the functions described herein. For example, one or more of the modules described herein can program a server to enable two or more clients (e.g., customers) to share an application that is running on the server. A server programmed in this manner can share an application, operating system, processing system, and/or storage system among multiple customers (i.e., tenants). One or more of the modules described herein can also partition data and/or configuration information of a multi-tenant application for each customer such that one customer cannot access data and/or configuration information of another customer.

According to various implementations, all or a portion of example system 100 in FIG. 1A and/or example system 132 in FIG. 1B can be implemented within a virtual environment. For example, the modules and/or data described herein can reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1A and/or example system 132 in FIG. 1B can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computing device, comprising:

rate control circuitry configured to govern a video encoding rate at least partly in response to video encoding quality information;

video encoding circuitry configured to generate an encoded video data bitstream based on input pixel data and according to the video encoding rate; and video quality determination circuitry configured to determine the video encoding quality information based on classifying reconstructed pixel data using one or more hints provided by the video encoding circuitry.

2. The computing device of claim 1, wherein the video quality determination circuitry includes a trained quality model that determines the video encoding quality information based on the reconstructed pixel data.

3. The computing device of claim 2, wherein the trained quality model determines the video encoding quality information independently of the input pixel data.

4. The computing device of claim 2, wherein the trained quality model determines the video encoding quality information additionally based on the input pixel data.

5. The computing device of claim 2, wherein the trained quality model is trained on quantization parameters provided to the video encoding circuitry and end user decisions regarding video encoding quality of video encoding results achieved using the quantization parameters.

6. The computing device of claim 1, wherein the rate control circuitry employs a trained rate control model that is trained on the video encoding quality information, the encoded video data bitstream, a set of video parameters, and the input pixel data.

7. The computing device of claim 1, wherein the rate control circuitry is configured to govern the video encoding rate additionally in response to video encoding cost information provided by the video encoding circuitry.

8. A system comprising:

an encoder configured to govern a video encoding rate at least partly in response to video encoding quality information, generate an encoded video data bitstream based on input pixel data and according to the video encoding rate, and determine the video encoding quality information based on classifying reconstructed pixel data using one or more hints; and a decoder configured to decode the encoded video data bitstream and output a decoded video data bitstream for display.

9. The system of claim 8, wherein the encoder is configured to employ a trained quality model that determines the video encoding quality information based on the reconstructed pixel data.

10. The system of claim 9, wherein the trained quality model determines the video encoding quality information independently of the input pixel data.

11. The system of claim 9, wherein the trained quality model determines the video encoding quality information additionally based on the input pixel data.

12. The system of claim 9, wherein the trained quality model is trained on quantization parameters and end user decisions regarding video encoding quality of video encoding results achieved using the quantization parameters.

13. The system of claim 8, wherein the encoder is configured to employ a trained rate control model that is trained on the video encoding quality information, the encoded video data bitstream, a set of video parameters, and the input pixel data.

14. The system of claim 8, wherein the encoder is configured to govern the video encoding rate additionally in response to video encoding cost information.

15. A computer-implemented method comprising:

governing, by at least one processor, a video encoding rate at least partly in response to video encoding quality information;

generating, by the at least one processor, an encoded video data bitstream based on input pixel data and according to the video encoding rate; and determining, by the at least one processor, the video encoding quality information based on classifying reconstructed pixel data using one or more hints.

16. The computer-implemented method of claim 15, further comprising:

employing, by the at least one processor, a trained quality model that determines the video encoding quality information based on the reconstructed pixel data.

17. The computer-implemented method of claim 16, wherein the trained quality model determines the video encoding quality information independently of the input pixel data.

18. The computing device of claim 1, wherein the video quality determination circuitry determines the video encoding quality information based on metadata of the reconstructed pixel data.

19. The computing device of claim 1 wherein the one or more hints provided by the video encoding circuitry to the video determination circuitry configured to determine the video encoding quality information based on classifying reconstructed pixel data using the one or more hints are hints related to an encoding process.

20. The computing device of claim 1, wherein the one or more hints provided by the video encoding circuitry to the video determination circuitry configured to determine the video encoding quality information based on classifying reconstructed pixel data using the one or more hints are hints related to one or more of: color information, motion, resolution, estimated error from a motion estimation, and transform selection.

* * * * *